(12) United States Patent
Duffield et al.

(10) Patent No.: US 6,601,095 B1
(45) Date of Patent: Jul. 29, 2003

(54) METHOD AND APPARATUS FOR REMOTE ADMINISTRATION OF PROGRAMMABLE WORKSTATIONS IN A DATA PROCESSING SYSTEM

(75) Inventors: Dana M. Duffield, Rochester, MN (US); Ronda M. Haley, Rochester, MN (US); Timothy Lynn Kramer, Rochester, MN (US); Daniel Duane Schulz, Rochester, MN (US); Allen M. Schmidt, Chicago, IL (US); James S. Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 07/687,276

(22) Filed: Apr. 18, 1991

(51) Int. Cl.[7] .............................................. G06F 13/00

(52) U.S. Cl. ..................................................... 709/222

(58) Field of Search ........................ 395/200, 51, 575, 395/700; 364/DIG. 1, DIG. 2; 709/200, 201, 203, 208, 209, 211, 216, 217, 218, 221, 222, 223

(56) References Cited

U.S. PATENT DOCUMENTS

| | | | | |
|---|---|---|---|---|
| 4,403,303 A | * | 9/1983 | Howes et al. .......... | 395/500.48 |
| 4,951,192 A | | 8/1990 | Chase et al. | |
| 4,979,107 A | * | 12/1990 | Advani et al. .............. | 710/100 |
| 5,109,486 A | * | 4/1992 | Seymour .................... | 395/200 |
| 5,138,712 A | * | 8/1992 | Corbin ........................ | 395/700 |
| 5,159,685 A | * | 10/1992 | Kung .......................... | 395/575 |
| 5,165,018 A | * | 11/1992 | Simor ......................... | 395/200 |
| 5,175,800 A | * | 12/1992 | Galis et al. ................... | 395/51 |
| 5,394,522 A | * | 2/1995 | Sanchez-Frank et al. ... | 709/220 |

OTHER PUBLICATIONS

Uniplus + System V Adminstrator Guide, Chapter II UUCP Adminstration 1984.*
Uniplus + System V Support Tools Guide, Chapter 9 UUCP: Unix system to Unix system Copy 1984.*
"Method to Create and Activate Profile Functions for Multiple–user Profiles" By L. S. Camp, E. Devany, L. Hedgemon and V.A. Mayfield, IBM Technical Disclosure Bulletin, vol. 28, No. 2, Jul. 1985, pps 787–789.
"Automatic Workstation–to–Host Configuration," IBM Technical Disclosure Bulletin, vol. 31, No. 3, Aug. 1988, pps. 93.

(List continued on next page.)

Primary Examiner—Robert B. Harrell
(74) Attorney, Agent, or Firm—Bracewell & Patterson, LLP

(57) ABSTRACT

A method and apparatus for remote administration of programmable workstations coupled to a host computer in a data processing system. Master user configuration files are established and stored in association with a host computer for selected programmable workstations, each including a desired or existing configuration for an associated programmable workstation. At least one user within the data processing system is designated as a system administrator and permitted to selectively alter particular master user configuration files. Thereafter, the altered master user configuration file is automatically copied to an associated programmable workstation, in response to an initiation of communication between the programmable workstation and the host computer, altering the configuration of that workstation. A configuration for a newly established or a migrated programmable workstation may be created by utilizing an existing master user configuration file associated with another programmable workstation or by utilizing a model master user configuration file created for that purpose. Multiple software applications stored in association with the host computer may be selectively added to or deleted from a programmable workstation utilizing the master user configuration file.

8 Claims, 6 Drawing Sheets

OTHER PUBLICATIONS

"Application Configuration Control Through the Use of Shared Memory," IBM Technical Bulletin, vol. 32, No. 9A, Feb. 1990, pps. 116–119.

"Remote System Management in Network Environments," by David M. Griffin and Brad C. Johnson, Digital Technical Journal, No. 9, Jun. 1989, pps. 29–36.

* cited by examiner

METHOD AND APPARATUS FOR REMOTE ADMINISTRATION OF PROGRAMMABLE WORKSTATIONS IN A DATA PROCESSING SYSTEM

BACKGROUND OF THE INVENTION

1. Field of the Invention

The present invention relates in general to the field of distributed data processing system management and in particular to a method and apparatus for selectively altering the configuration files of multiple programmable workstations. Still more particularly, the present invention relates to a method and apparatus for remotely administering and/or creating a plurality of configuration files for multiple programmable workstations.

2. Description of the Related Art

Distributed data processing systems are well known in the prior art. It is not uncommon for such distributed data processing systems to include one or more host systems and thousands of programmable workstation (PWS) devices which may be physically located in a widely distributed manner. In existing distributed data processing systems each programmable workstation is an environment unto itself. Typically, a staff of experts is maintained for each distributed data processing system having the necessary skills to keep each programmable workstation productive in a large network of programmable workstation clients. Such experts are typically referred to as administrators and, in order to support a large network of programmable workstations attached to a host computer, these individuals must manage each users configuration in order to accurately administer the network.

The management and administration of configurations for programmable workstations is well documented in the art. For example, International Business Machines Incorporation Technical Disclosure Bulletin Volume 28, No. 2, July 1985, discloses a method for storing multiple configurations on behalf of a single user in a single DOS file stored within the programmable workstation. This technique is utilized to permit a user of a programmable workstation to store and utilize multiple different configurations for different situations. IBM Technical Disclosure Bulletin Volume 31, No. 3, August 1988, discloses a method for automatic workstation-to-host and configuration. This technique permits a configuration stored at a programmable workstation to notify a host of the device configuration utilized by the particular workstation.

U.S. Pat. No. 4,979,107, issued to Advani et al, and assigned to the assignee herein, discloses a process for the modification of device configuration which prompts the user for only those parameters which are required to be changed. The system then stores these parameters and may thereafter readily identify differences in hardware configuration for that user.

U.S. Pat. No. 4,951,192, issued to Chase, Jr. et al, and assigned to Apollo Computer, Inc., discloses a software configuration management system which utilizes a network computing environment to build large software systems in parallel. This system permits the development of software systems throughout a network in parallel; however, the system may not be utilized to alter the configuration files of multiple different programmable workstations.

U.S. Pat. No. 4,403,303, issued to Howes et al, and assigned to Beehive International, discloses a terminal configuration manager which may be utilized unto store standard configuration data to permit a host computer to readily identify the hardware configuration for a selected terminal.

Finally, an article entitled "Remote System Management in Network Environments", published in Digital Technical Journal, number 9, June 1989, discloses a function which provides support for software installation and file backup for workstations within a network. However, this article fails to disclose a method whereby the user configurations for multiple programmable workstations may be managed and altered from a central location. Thus, it should be apparent that a need exists for a method and apparatus whereby the user configuration files for multiple programmable workstations may be remotely administered and/or created within a distributed data processing system.

SUMMARY OF THE INVENTION

It is therefore one object of the present invention to provide an improved distributed data processing management system.

It is another object of the present invention to provide a method and apparatus for selectively altering the configuration files of multiple programmable workstations within a distributed data processing system.

It is yet another object of the present invention to provide an improved method and apparatus for remotely administering and/or creating a plurality of configuration files for multiple programmable workstations in a distributed data processing system.

The foregoing objects are achieved as is now described. The method and apparatus of the present invention may be utilized to remotely administer a plurality of programmable workstations coupled to a host computer in a data processing system. Master user configuration files are established and stored in association with a host computer for selected programmable workstations, each including a desired or existing configuration for an associated programmable workstation. At least one user within the data processing system is designated as a system administrator and permitted to selectively alter particular master user configuration files. Thereafter, the altered master user configuration file is automatically copied to an associated programmable workstation, in response to an initiation of communication between the programmable workstation and the host computer, altering the configuration of that workstation. A configuration for a newly established or a migrated programmable workstation may be created by utilizing an existing master user configuration file associated with another programmable workstation or by utilizing a model master user configuration file created for that purpose. Multiple software applications stored in association with the host computer may be selectively added to or deleted from a workstation by utilizing the master user configuration file.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
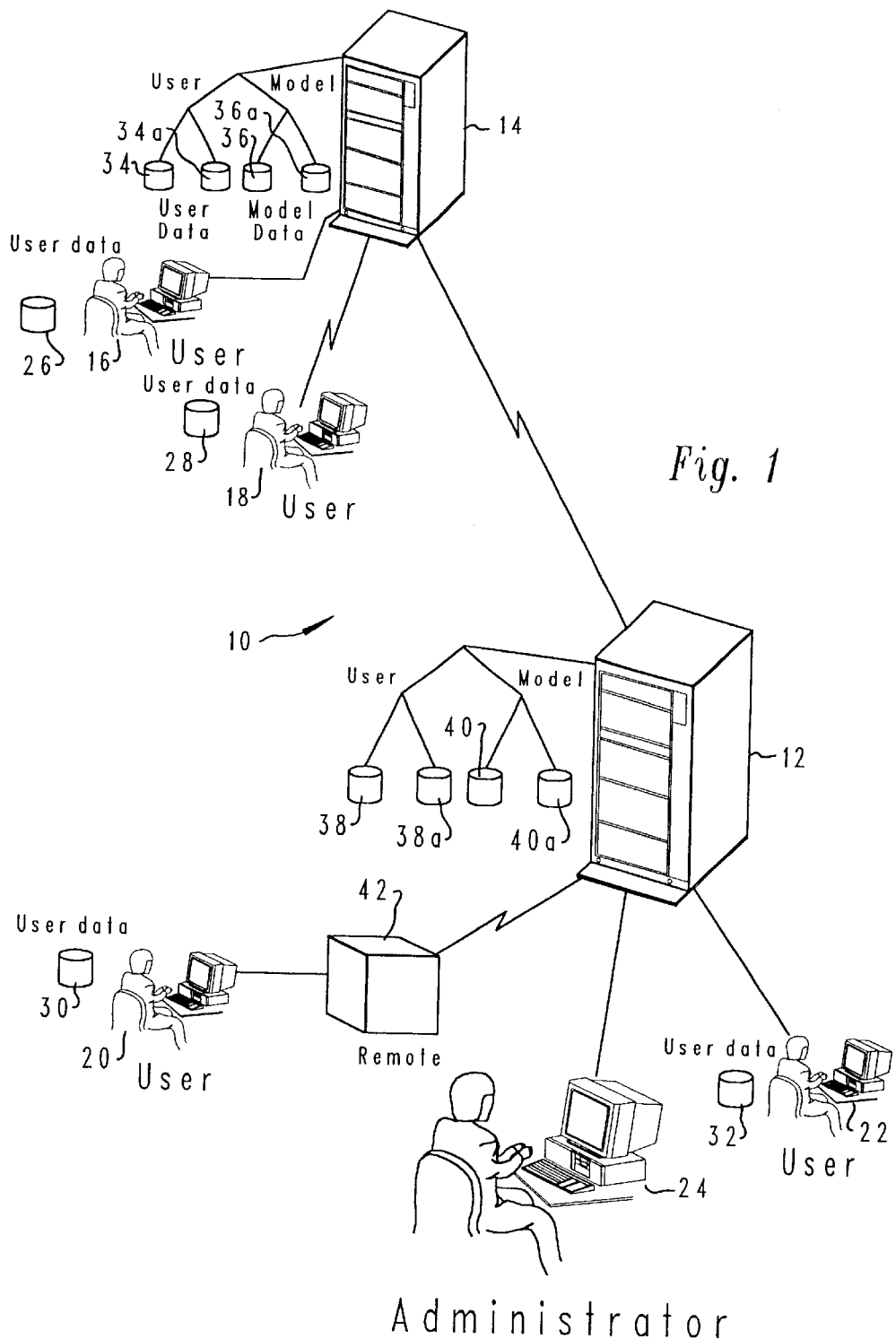
FIG. 1 is a pictorial representation of a data processing system which may be utilized to implement the method and apparatus of the present invention.

With reference now to the figures and in particular with reference to FIG. 1, there is depicted a pictorial representation of a data processing system 10 which may be utilized to implement the method and apparatus of the present invention. As is illustrated, data processing system 10 includes multiple host systems 12 and 14. Host systems 12 and 14 may be implemented utilizing any suitable midrange or mainframe computer such as the model AS/400 midrange computer manufactured by International Business Machines Corporation of Armonk, New York.

In a manner well known in the prior art each host system 12 or 14 includes a plurality of programmable workstations 16, 18, 20, 22, and 24 which are coupled into the host system in any manner well known in the art. Additionally, it may be seen that selected users, such as programmable workstation 20 may be coupled to a host station 12 via a remote server connection 42. Those skilled in the art will appreciate that there exist many different ways of coupling individual workstations to a host system including: Twinaxial connections; Twinaxial connections via a Model 5394 controller; Token Ring networks; Ethernet networks; a Synchronous Data Link Control (SDLC); an asynchronous communications network; or, utilizing the X0.25 standard. Each of these network systems may be utilized to couple thousands of remote users to a host system in the manner generally depicted within FIG. 1. Of course, it should be appreciated that each user may be located a wide geographic distance from an associated host system.

Still referring to FIG. 1 it may be seen that each user and programmable workstation coupled to a host system has associated therewith a storage areas 26, 28, 30, or 32, which may be utilized, in a manner well known in the art, to store various files applications and other data necessary to operate each programmable workstation. Additionally, it is common for each storage area associated with a programmable workstation to include certain configuration files which comprise each user's individual preference settings for the environment represented within their own personal programmable workstation.

Also illustrated within FIG. 1 is another important feature of the present invention. Each host system 12 or 14 has associated with it a plurality of storage areas provided within well known storage devices. Such devices may comprise disk drives, tape drives, or any other suitable data storage device. In accordance with an important feature of the present invention selected storage area 34, 3a, 38, and 38a are utilized to store separate master user configuration files representing the existing or desired configuration for multiple programmable workstations within data processing system 10.

In the depicted embodiment of the present invention these files are preferably stored together in a so-called "folder" relationship which is utilized to electronically group related documents within a storage device. Similarly, host system storage areas 36, 36a, 40, and 40a are utilized, in accordance with an important feature of the present invention, to store selected separate model master user configuration files which may be established and utilized to create newly established programmable workstations within data processing system 10, in a manner which will be explained in greater detail herein.

Figure 2:
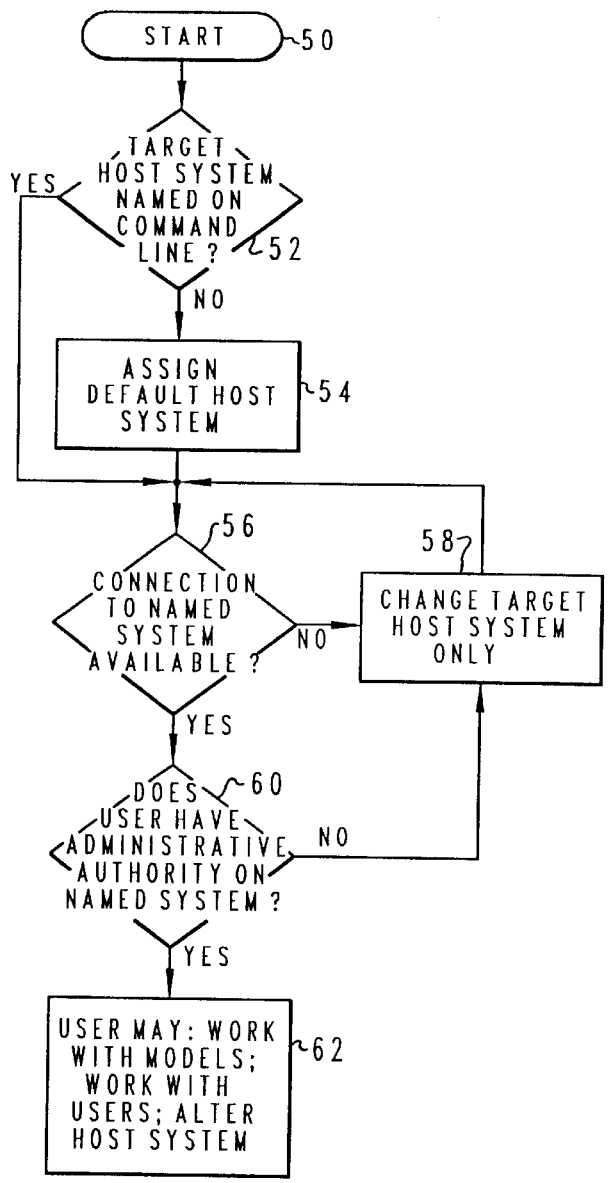
FIG. 2 is a logic flow chart illustrating the initialization of a remote administration in accordance with the method and apparatus of the present invention.

Referring now to FIG. 2 there is depicted a logic flow chart which illustrates the initialization of a remote administration in accordance with the method and apparatus of the present invention. As illustrated, the process begins at block 50 and thereafter passes to block 52 which illustrates a determination of whether or not a target host system has been named on the command line in a request for initialization. If not, the process passes to block 54 which depicts the assigning of a default host system. Thereafter, after determining that the target host system has been named, or after assigning a default host system, the process passes to block 56 which illustrates a determination of whether or not the current administrator has a connection to the named system. If not, the process passes to block 58 which illustrates the administrator being permitted to only change the configuration files within the target host system. This situation will continue until such time as a determination is made within block 56 that a connection to the selected system is available. Thereafter the process passes to block 60.

Block 60 illustrates a determination as to whether or not the current administrator has administrative authority on the named system, and if not, the process again returns to block 58 where the administrator is only permitted to alter files within the target host system only. Referring again to block 60, if a connection to the named system is available and the current administrator has administrative authority on that system, the process passes to block 62 which illustrates that the administrator is permitted to perform selected administrative functions such as: working with model master configuration files; working with user master configuration files; and, altering the host system.

Figure 3:
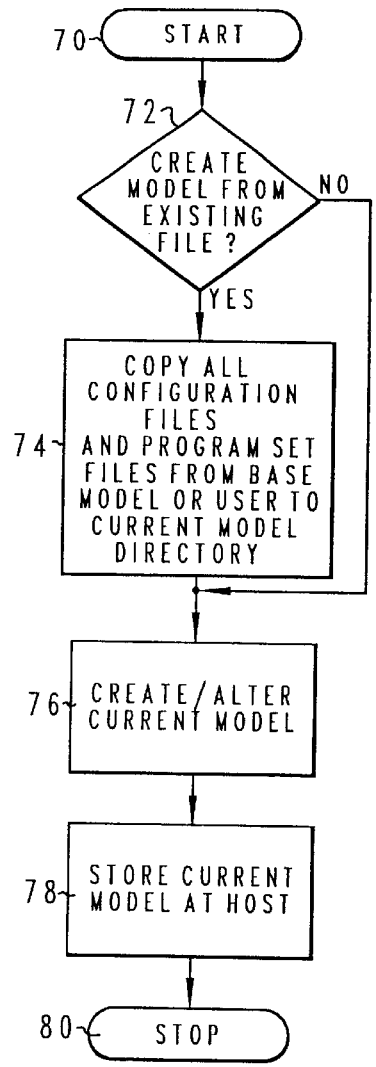
FIG. 3 is a logic flow chart illustrating the creation of a model master configuration file in accordance with the method and apparatus of the present invention.

With reference now to FIG. 3 there is depicted a logic flow chart which illustrates the creation of a model master configuration file in accordance with the method and apparatus of the present invention. It is an important feature of the present invention that the method and apparatus disclosed herein permits an administrator to create a model master user configuration file which may thereafter be utilized to create configuration files for newly established programmable workstations within the data processing system. In this manner, newly established programmable workstations may be efficiently created or migrated into an established data processing system without requiring a configuration file to be created completely from scratch.

As above, this process begins at block 70 and thereafter passes to block 72 which illustrates a determination of whether or not the model to be created will be created from an existing configuration. If so, the process passes to block 74 which illustrates the copying of all configuration files and program set files from the base model or existing user to the current model directory. Thereafter, the process passes to block 76.

After all configuration files and program set files from the base model or existing user have been copied to the current model directory, or in the event a model is to be created anew as determined in block 72, the process then passes to block 76. Block 76 depicts the creation/alteration of the current model, whether the current model has been created from an existing model or user or was created entirely anew. Thereafter, block 78 illustrates the storing of the current model at the host for future utilization and the process then terminates as depicted in block 80.

Figure 4:
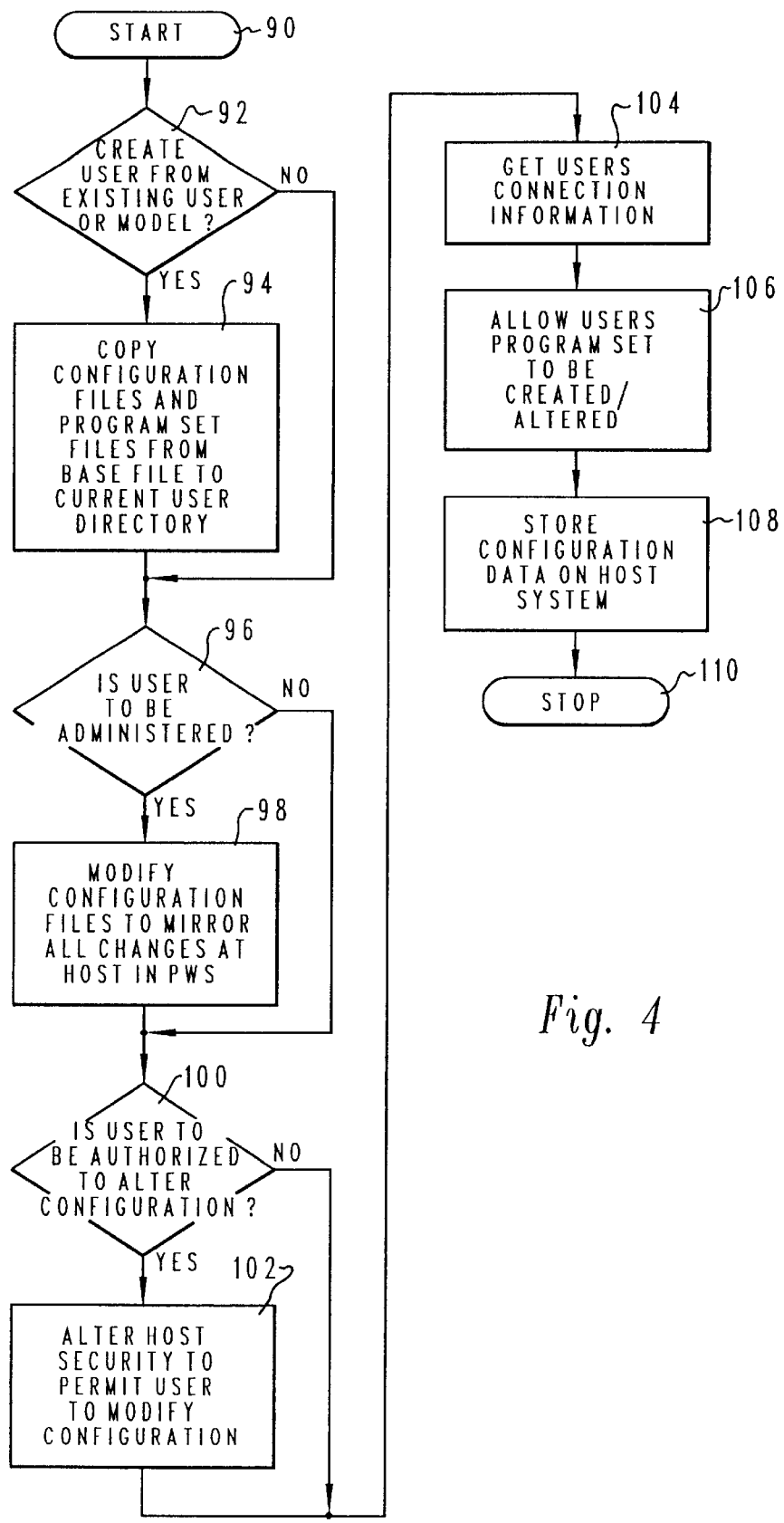
FIG. 4 is a logic flow chart illustrating the creation of a newly established programmable workstation configuration in accordance with the method and apparatus of the present invention.

Referring now to FIG. 4 there is depicted a logic flow chart illustrating the creation of a newly established programmable workstation configuration in accordance with the method and apparatus of the present invention. This process will preferably be utilized upon the establishment of a newly created programmable workstation or upon the migration of an existing programmable workstation from a different data processing system into the present data processing system.

As depicted, the process begins at block 90 and thereafter passes to block 92 which illustrates a determination of whether or not the newly created programmable workstation is to be created from an existing user or model. If so, the process passes to block 94, which illustrates the copying of the configuration files and program set files from the base file (whether the base file is an existing user or a model user) to the current user directory.

Thereafter, the process passes to block 96 which depicts a determination of whether or not the user is to be an administered user. By "administered" user what is meant in the context of the present application is a user whose configuration is to be controlled by an administrator from the host system, in accordance with the method and apparatus of the present invention. In the event the user is to be an administered user the process passes to block 98, which depicts the contained modification of configuration files to mirror all changes made to the master user configuration files at the host system in the configuration files of the programmable workstation.

Next, the process passes to block 100 which illustrates a determination as to whether or not the user is to be authorized to alter the configuration of that user's programmable workstation. If so, block 102 illustrates the altering of the host security to permit that user to modify the master user configuration files stored at the host system in accordance with the method of the present invention. In this manner, a user who is experienced in such matters may easily and efficiently modify the configuration files for the environment of his or her own programmable workstation while simultaneously modifying the master user configuration file maintained at the host system, in accordance with the present invention. Still referring to blocks 92, 96, and 100, in the event the decision depicted in each of those block results in a negative response, the immediate subsequent procedure is bypassed, in the manner graphically depicted.

Next, referring to block 104, the system obtains the user's connection information, indicating the manner in which the user will be connected to the host system. Thereafter, block 106 illustrates the allowing the user's program set to be created and/or altered and thereafter, the configuration data is stored on a host system as illustrated in block 108. In this manner, a master user configuration file is created and stored in an appropriate folder on the host system so that an administrator may readily obtain information regarding the configuration of an individual programmable workstation and alter or modify that configuration data as desired. Thereafter, the process terminates, as depicted in block 110.

Figure 5:
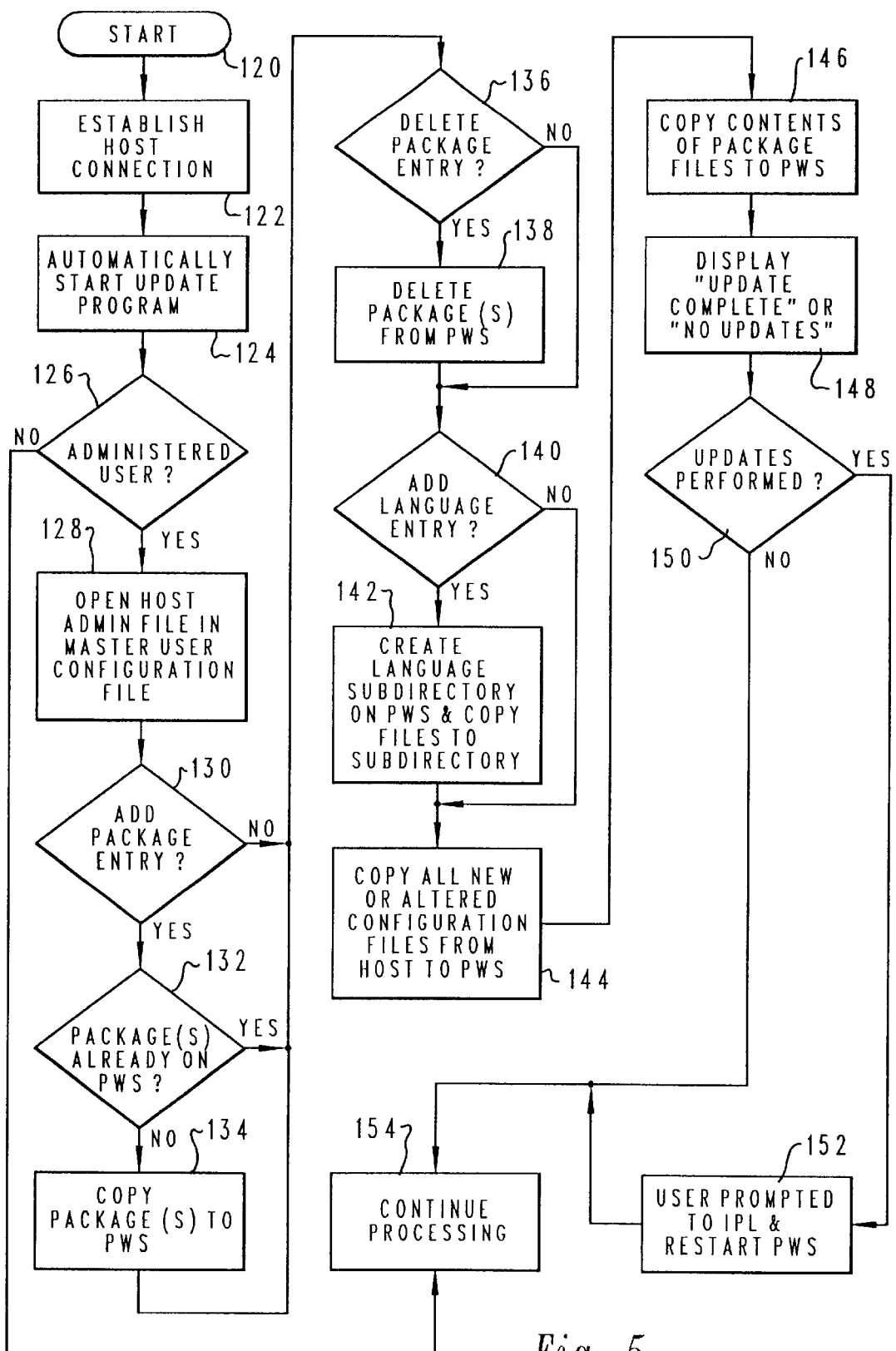
FIG. 5 is a logic flow chart illustrating the automatic updating of the configuration of a programmable workstation in accordance with the method and apparatus of the present invention.

With reference now to FIG. 5 another important feature of the present invention is illustrated. FIG. 5 depicts a logic flow chart illustrating the automatic updating of the configuration files of a selected programmable workstation in accordance with the method and apparatus of the present invention. As above, the process begins at block 120 thereafter passes to block 122 which illustrates the establishment of a host connection between a selected programmable workstation and the host system. Thereafter, as depicted in block 124, the update program is automatically started in response to the establishment of a host connection.

The automatic update program of the present invention begins at block 126, which illustrates a determination of whether or not the user having established a connection between his programmable workstation and the host system is an administered user. That is, a user whose configuration is controlled by a system administrator from the host system. If not, the process merely passes to block 154 which illustrates the continued processing of data within the programmable workstation in a manner well known in the art.

In the event the user having established a connection to the host system is determined to be an administered user, as illustrated in block 126, the process then passes to block 128 which depicts the opening of the host administration file in the master user configuration file for the programmable workstation in question. Next, the process passes to block 130 which depicts a determination of whether or not an add package entry is contained within the host administration file within the master user configuration file for this workstation. By "add package entry" what is meant is an instruction that certain personal application software for this programmable workstation is to be added by copying a particular program package to the programmable workstation. If so, the process passes to block 132 which depicts a determination of whether or not the package or packages desired to be added are already present on the programmable workstation. If not, the process passes to block 134 and the copying of the desired package or packages of software applications from the host system to the programmable workstation is illustrated.

Next, in the event no add package entry was found within the host administration file in the master user configuration file, or the desired package was already present on the programmable workstation, or following the copying of the desired package(s) of applications to the programmable workstation, the process passes to block 136.

Block 136 illustrates a determination of whether or not a delete package entry is found within the host administration file of the master user configuration file for this programable work station. By "delete package entry" what is meant is a command instructing that selected packages of software applications are to be deleted from the programmable workstation in question. Thereafter, the process passes to block 138 which illustrates the deleting of the specified package or packages from the programmable workstation, in the event a delete package entry has been found.

Thereafter, or in the event no delete package entry was found within the host administration file of the master user configuration for this programmable workstation, the process passes to block 140.

Block 140 illustrates a determination of whether or not an add language entry is found within the host administration file of the master user configuration file of the programmable workstation in question. By "add language entry" what is meant an entry directing that an additional national language be added to the selected programmable workstation. If an add language entry is found the process passes to block 142 which depicts the creation of a language subdirectory on the programmable workstation and the copying of the appropriate files to that subdirectory. Thereafter, or in the event no add language entry was found within the host administration file in the master user configuration file, the process passes to block 144 which depicts the copying of all new or altered configuration files from the host system to the programmable workstation.

Next, block 146 illustrates the copying of the contents of the package files to the programmable workstation and thereafter block 148 illustrates the displaying of a "update complete" or "no updates" message to the user at the selected programmable workstation.

Finally, block 150 illustrates a determination of whether or not any updates to the configuration file of the programmable workstation were performed and if so, block 152 depicts the prompting of the user to Initial Program Load (IPL) and restart the programmable workstation in order to initiate utilization of the updated configuration files. Thereafter, the process passes to block 154, illustrating the continued processing of data within the programmable workstation.

Upon reference to the foregoing flow chart those skilled in the art will appreciate that the method and apparatus of the present invention may be utilized to efficiently manage the configuration files of a plurality of programmable workstations coupled to a host system within a data processing system by automatically updating the configuration files of those programmable workstations which are administered by the system administrator, in response to the establishment of a connection between a programmable workstation and the host system.

Figure 6:
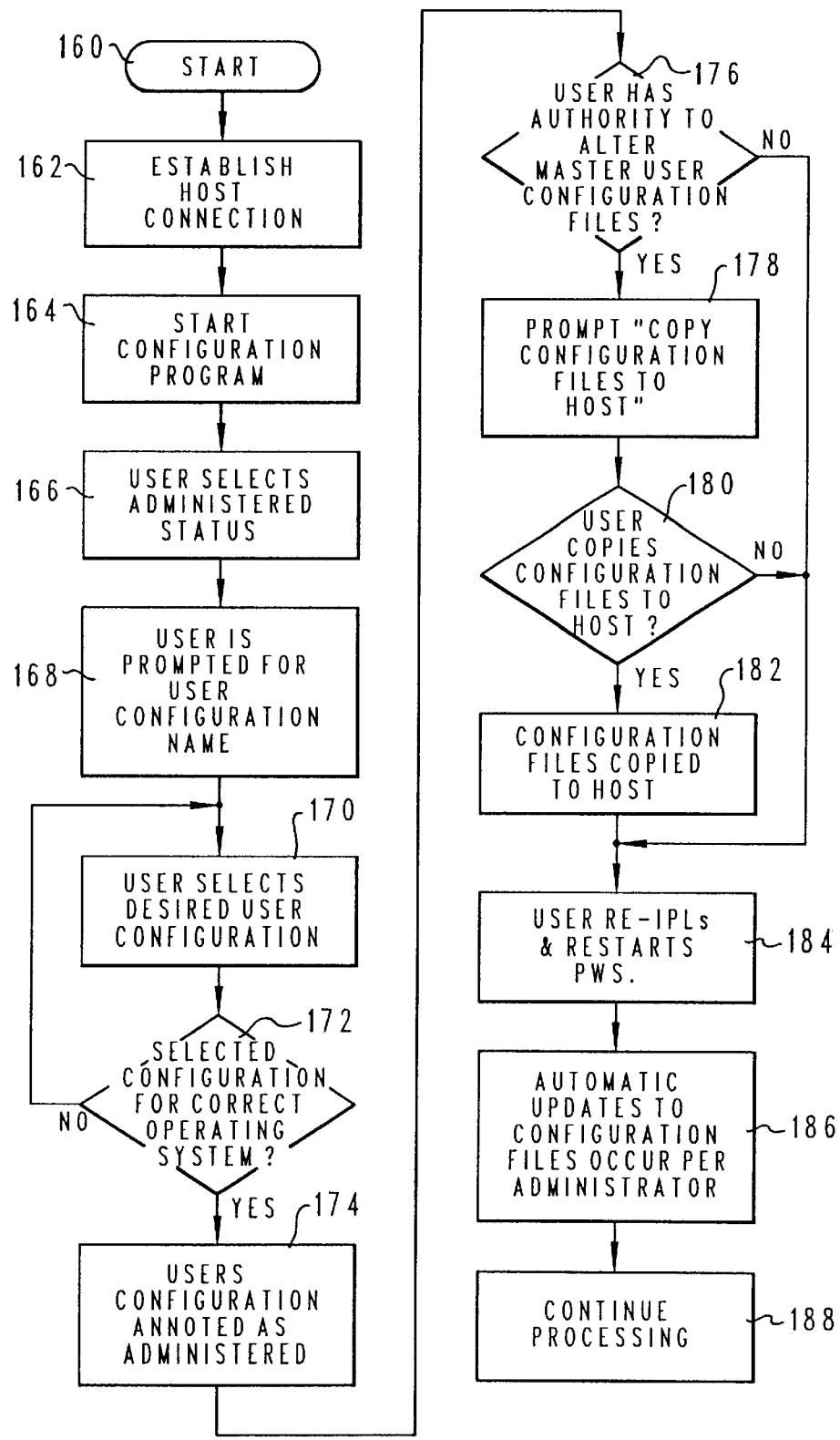
FIG. 6 is a logic flow chart illustrating the election of administered status by a user of a programmable workstation in accordance with the method and apparatus of the present invention.

Referring now to FIG. 6 there is depicted a logic flow chart illustrating the election of an administered status by a user of a programmable workstation in accordance with the method and apparatus of the present invention. As above, this process begins at block 160 and thereafter passes to block 162 which depicts the establishment of a host connection between the programmable workstation in question and the host system. Next, block 164 illustrates the starting of the configuration program and block 166 depicts the selection by the user of the administered status. By "administered" status what is meant is the programmable workstation in question will thereafter have its configuration files altered, updated and administered by a system administrator from the host system, in accordance with the method and apparatus of the present invention.

The process next passes to block 168 which illustrates the prompting of the user for a particular user configuration name. This name will be associated with the master user configuration file established at the host system and will permit the system administrator to accurately identify the user or programmable workstation associated with this configuration file. Next, the user selects a desired user configuration, as illustrated in block 170. Block 172 depicts a determination of whether or not the configuration selected by the user is proper for the operation system utilized by that user. For example, selected configuration files may be only appropriate for a user utilizing the DOS operating system while other configuration files may be appropriate for a user utilizing the OS/2 system. In the event the improper configuration has been selected the process returns to block 170 and the user is once again prompted to select a desired user configuration.

After selecting a proper configuration for the operating system in use the process passes to block 174 which illustrates the annotation of the master user configuration file for this programmable workstation, indicating that this user is an administered user.

Next, the process passes to block 176 which illustrates a determination of whether or not the user was given authority to alter master user configuration files. If so, the process passes to block 178 which illustrates the prompting of the user to copy their current configuration files to the host system. Thereafter, block 180 illustrates a determination of whether or not the user wishes to copy their configuration files to the host and block 182 illustrates the successful copying of those files into the host.

In the event the user was not given authority to alter master user configuration files or, in the event the user has not copied their current configuration files onto the host the process will then pass to block 184. Block 184 illustrates the prompting of the user to re-Initial Program Load (IPL) and restart the programmable workstation.

Next, block 186 illustrates the automatic updating of the configuration files for this particular programmable workstation in accordance with the process described above with respect to FIG. 5. In this manner, the configuration files for a particular programmable workstation may be automatically updated in response to the establishment of a connection between the programmable workstation and the host system in a highly efficient manner. Finally, the process passes to block 188 which illustrates the continued processing of data at the programmable workstation by the user.

Figure 7:
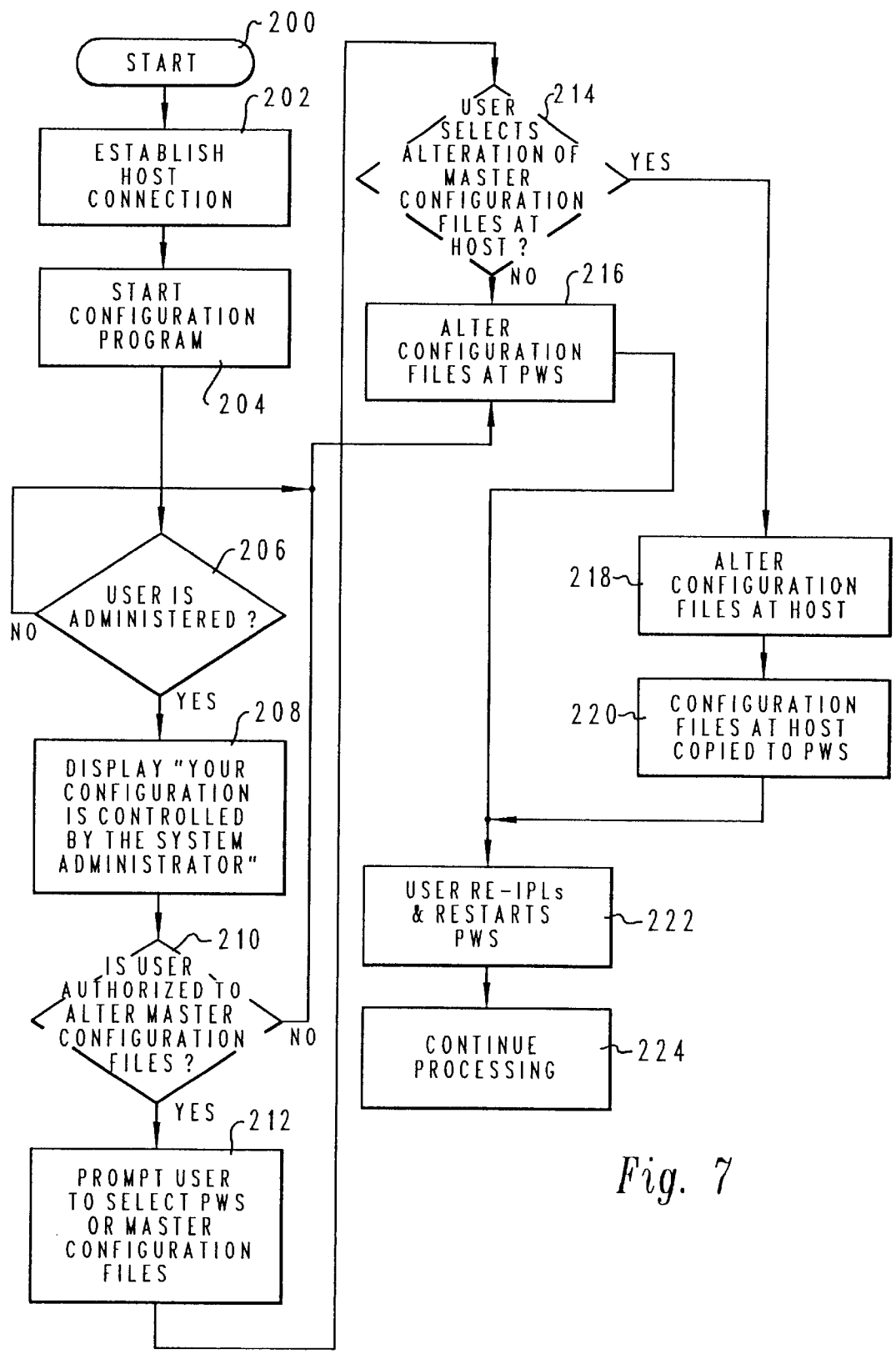
FIG. 7 is a logic flow chart illustrating the alteration of a programmable workstation configuration by a user in accordance with the method and apparatus of the present invention.

Finally, with reference to FIG. 7, there is depicted a logic flow chart illustrating the alteration of a programmable workstation configuration by a user in accordance with the method and apparatus of the present invention. This process begins at block 200 and thereafter passes to block 202 which illustrates the establishment of a host connection for the programmable workstation. Next, the process passes to block 204 which depicts the starting of the configuration program. Block 206 then illustrates a determination as to whether or not the user in question is an administered user. That is, a user whose configuration files are maintained by a system administrator at the host system. If so, the process passes to block 208 which illustrates the displaying of a message indicating "Your configuration is controlled by the system administrator". In the event the user has not elected an administered status, as determined in block 206, the process passes to block 216 which depicts the alteration of the configuration files by the user at the programmable workstation.

After determining that the user in question is an administered status user and after displaying a prompt that the configuration of the programmable workstation is controlled by the system administrator the process passes to block 210. Block 210 illustrates a determination of whether or not the user is authorized to alter master configuration files. Those skilled in the art will appreciate that it is possible for multiple users within a data processing system to be designated as system administrators and permitted to alter master user configuration files within a system such as that proposed in the present application. In the event the user is not authorized to alter master user configuration files the process again returns to block 216, which depicts the alteration of configuration files at the programmable workstation.

Referring again to block 210, in the event the user is authorized to alter master user configuration files the process passes to block 212. Block 212 illustrates a prompting of the user to select either programmable work station configuration files or master user configuration files for alteration. Block 214 then depicts a determination of whether or not the user has elected to alter the master user configuration files at the host system. If not, the process again returns to block 216 and the configuration files maintained at the programmable workstation are altered, in accordance with the desires of the user.

Referring again to block 214, in the event the user has elected alteration of the master user configuration files at the host the process passes to block 218 . Block 218 illustrates the alteration of the configuration files at the host and thereafter block 220 depicts the copying of those altered configuration files at the host system to the programmable workstation, in accordance with the automatic update feature previously discussed.

Thereafter, after either altering the configuration files directly at the programmable workstation or after altering the master user configuration files at the host and permitting those alterations to be copied to the programmable workstation the process passes from block 216 or block 220 to block 222. Block 222 illustrates the re-Initial Program Loading (IPL) and restarting of the programmable workstations in order to initiate the altered configuration files. The process then passes to block 224, which illustrates the continued processing of data at the programmable workstation.

Upon reference to the foregoing those skilled in the art will appreciate that the applicants in the present application have created a method and apparatus whereby a network of programmable workstation may be maintained remotely by a system administrator utilizing master user configuration files maintained at the host system within the data processing system and the automatic propagation of changes to those master user configuration files throughout the network. In this manner a network of thousands of programmable workstations may be simply and efficiently maintained without requiring a large staff of programmable workstation administrators to be disposed throughout the entire data processing system.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method in a data processing system for administering multiple programmable workstations coupled to a host computer, said method comprising the steps of:

creating a plurality of master user configuration files, each of said plurality of master user configuration files specifying a configuration for one of a plurality of programmable workstations coupled to said host computer;

storing said plurality of master user configuration files in association with said host computer;

designating at least one user within said data processing system as system administrator;

permitting only said system administrator to selectively alter a particular one of said plurality of master user configuration files; and automatically copying said selectively altered master user configuration file to an associated newly established programmable workstation in response to an initiation of communication between said associated newly established programmable workstation and said host computer.

2. The method in a data processing system for administering multiple programmable workstations coupled to a host computer according to claim 1 further including the step of storing a plurality of software applications in association with said host computer.

3. The method in a data processing system for administering multiple programmable workstations coupled to a host computer according to claim 2 wherein each of said plurality of master user configuration files includes an indication of selected ones of said plurality of software applications included in a configuration for an associated newly established programmable workstation.

4. The method in a data processing system for administering multiple programmable workstations coupled to a host computer according to claim 1 further including the step of creating at least one model master user configuration file representative of a model configuration for a programmable workstation.

5. The method in a data processing system for administering multiple programmable workstations coupled to a host computer according to claim 1 further including the step of permitting a user to selectively alter a master user configuration associated with a selected programmable workstation utilized by said user.

6. A data processing system for administering multiple programmable workstations coupled to a host computer within said data processing system, said system comprising:

memory means associated with said host computer;

a plurality of master user configuration files stored within said memory means, each of said plurality of master user configuration files specifying a configuration for an associated programmable workstation;

input means for permitting only a system administrator to selectively alter a particular one of said plurality of master user configuration files; and means for copying said selectively altered master user configuration file to an associated newly established programmable workstation in response to an initiation of communication between said associated newly established programmable workstation and said host computer wherein a configuration for a selected programmable workstation is controlled remotely by said system administrator.

7. The data processing system for administering multiple programmable workstations coupled to a host computer within said data processing system according to claim 6 further including at least one model user configuration file stored within said memory means, said at least one model user configuration file including a model configuration for a programmable workstation.

8. The data processing system for administering multiple programmable workstations coupled to a host computer within said data processing system according to claim 6 further including a plurality of software applications stored within said memory means for selective inclusion within a programmable workstation.

* * * * *